United States Patent
Cueman

(10) Patent No.: US 6,765,993 B2
(45) Date of Patent: Jul. 20, 2004

(54) INFORMATION GATHERING SYSTEM FOR REMOTELY MONITORING AND DIAGNOSING EQUIPMENT CONDITION

(75) Inventor: Michael Kent Cueman, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 59 days.

(21) Appl. No.: 09/681,257

(22) Filed: Mar. 9, 2001

(65) Prior Publication Data

US 2002/0126804 A1 Sep. 12, 2002

(51) Int. Cl.[7] .............................................. H04M 11/04
(52) U.S. Cl. ..................................... 379/40; 340/853.2
(58) Field of Search ......................... 379/39–40, 93.01, 379/93.12, 90.01, 100.05, 106.01, 106.08; 340/853.2, 825.22, 5.9, 870.02; 700/221–222, 231; 235/381; 705/26, 28; 600/300; 701/117, 213; 714/718; 370/433

(56) References Cited

U.S. PATENT DOCUMENTS

| | | | |
|---|---|---|---|
| 4,271,512 A | * 6/1981 | Lyhus ......................... | 714/718 |
| 4,326,100 A | 4/1982 | Polacsek ................... | 179/1 VE |
| 4,362,907 A | 12/1982 | Polacsek ................... | 179/1 VE |
| 4,445,228 A | 4/1984 | Bruni .......................... | 381/24 |
| 4,631,357 A | * 12/1986 | Grunig ................... | 379/106.01 |
| 4,665,544 A | 5/1987 | Honda et al. | |
| 4,697,180 A | * 9/1987 | Swanson ............... | 340/870.02 |
| 4,768,870 A | 9/1988 | Chen .......................... | 350/631 |
| 4,916,621 A | * 4/1990 | Bean et al. ................. | 701/117 |
| 5,268,811 A | 12/1993 | Maeda | |
| 5,844,808 A | * 12/1998 | Konsmo et al. ........ | 379/100.05 |
| 5,956,487 A | 9/1999 | Venkatraman et al. | |
| 5,997,170 A | * 12/1999 | Brodbeck ................ | 379/90.01 |
| 6,080,972 A | 6/2000 | May | |
| 6,233,327 B1 | * 5/2001 | Petite .......................... | 379/143 |
| 6,256,378 B1 | 7/2001 | Iggulden et al. | |
| 6,398,727 B1 | * 6/2002 | Bui et al. .................... | 600/300 |
| 6,463,385 B1 | * 10/2002 | Fry ............................. | 701/213 |
| 6,494,829 B1 | * 12/2002 | New et al. ................... | 600/300 |
| 6,584,113 B1 | * 6/2003 | Manduley et al. .......... | 370/433 |

FOREIGN PATENT DOCUMENTS

| | | |
|---|---|---|
| DE | 23 32 885 | 1/1975 |
| EP | 0 846 598 | 6/1998 |
| WO | WO 97/09842 | 3/1997 |
| WO | WO 98/42536 | 10/1998 |

* cited by examiner

Primary Examiner—George Eng
(74) Attorney, Agent, or Firm—Armstrong Teasdale LLP

(57) ABSTRACT

An information gathering system for remotely monitoring and diagnosing the condition of equipment includes at least one sensor, electronic controller, electronic module and data processor unit. The electronic controller is connected to monitored equipment and operable to sense and electronically store an indication of the equipment condition. The electronic module is removably connectible with the electronic controller and operable to electronically record the indication of equipment condition, removably connectible with a telephone outlet and capable of sensing connection therewith, and preprogrammed to dial the telephone number of a data processor unit at a remote service provider location. The data processor unit responds to the dialed telephone number, downloads the electronic indication, analyzes it and outputs a recommended course of action.

17 Claims, 2 Drawing Sheets

US 6,765,993 B2

INFORMATION GATHERING SYSTEM FOR REMOTELY MONITORING AND DIAGNOSING EQUIPMENT CONDITION

BACKGROUND OF INVENTION

The present invention generally relates to service and maintenance of equipment, especially household appliances, and, more particularly, is concerned with an information gathering system for remotely monitoring and diagnosing the condition of such equipment.

Most household appliances, such as dishwashers, clothes washers and dryers and the like, historically are relatively low cost products and have operated dependably and reliably over long periods of use without significant problems. However, household appliances have to be used frequently so breakdowns, though occurring infrequently, cause considerable inconvenience due to their disruption of daily household routines. Delays normally expected and experienced in scheduling service calls only add to this inconvenience.

Over the years it has been difficult to devise a cost-effective way to reduce the inconvenience and delay associated with household appliance breakdowns and repair. Proposals for arranging periodic service calls to check the condition of the household appliances and perform preventive maintenance before breakdowns occur are deemed to be too expensive for consumers and thus an unacceptable solution to this problem.

Consequently, a need still exists for an innovation which will provide a cost-effective solution to the aforementioned problem.

SUMMARY OF INVENTION

The present invention provides an information gathering system designed to satisfy the aforementioned need. The information gathering system of the present invention remotely monitors and diagnoses the condition of the equipment. The system employs a detachable electronic module that is easy to use to electronically gather information that is necessary to monitor and diagnose low cost products, such as household appliances, which do not justify monitoring via a permanent connection to either a telephone or the Internet.

In an embodiment of the present invention, an information gathering system for remotely monitoring and diagnosing the condition of equipment is provided which comprises: means for sensing and electronically storing an indication of the condition of monitored equipment; an electronic module removably connectible with the sensing and storing means and operable to electronically receive and record the indication, the electronic module also removably connectible with a telephone outlet and capable of sensing connection with the telephone outlet and being preprogrammed to call a predetermined telephone number in response to sensing the connection; and means in the form of a data processor unit for responding to the call at a service provider location and in response thereto for downloading and analyzing the equipment condition indication so as to provide an output of a recommended course of action to be taken in order to maintain the equipment in operative condition.

The means for sensing and electronically storing the equipment condition indication includes at least one sensor and an electronic controller. The sensor is connectible with the monitored equipment and operable to produce an electrical signal in response to operation of the monitored equipment that provides the indication of the condition of the monitored equipment. The electronic controller is connected to the sensor and operable to receive the electrical signal produced by the sensor, store the electrical signal and produce an output electronically representative of the electrical signal.

The electronic module includes an electronic memory, a communications interface having a telephone plug connectible with the telephone outlet, and a control circuit between and interconnected with the electronic memory and communications interface. The electronic memory is preprogrammed to store the predetermined telephone number. The communications interface is operable to sense a dial tone in response to connection of the telephone plug with the telephone outlet. The control circuit is connectible with the electronic controller and operable to receive and store the equipment condition indication signal and to cause generation of the predetermined telephone number by the electronic memory and to transmit the generated predetermined telephone number and the stored equipment condition indication signal to the telephone outlet via the communications interface and the telephone plug thereof.

DETAILED DESCRIPTION

As used herein, the term "Computer" means a programmable device that responds to a specific set of instructions. A computer can be electronic or digital. The actual machinery, for example, wires, transistors, and circuits is called hardware and the instructions are called software. Most computers typically comprise: a memory that enables a computer to store, at least temporarily, data and programs; a mass storage device that allows a computer to permanently retain large amounts of data (common mass storage devices include disk drives and tape drives); an input device, for example, a keyboard or mouse, through which data and instructions enter a computer; an output device for example a display, screen or printer or other device that lets you see what the computer has accomplished; and a central processing unit (CPU), the component that executes instructions. In addition to these components, many other components make it possible for the basic components to work together efficiently. For example, most computers have a bus that transmits data from one part of the computer to another. Some examples of typical computers are a personal computer, a workstation, a minicomputer, multi-user computer, a mainframe, or a supercomputer.

As used herein, the term "Database" means a collection of organized data. The data is typically organized for rapid search and retrieval by a computer.

As used herein, the term "Internet" means a global network of computers.

As used herein, the term "Intranet" means a secure network, typically belonging to an organization, for example, a corporation, accessible only by that organization's members, employees, or others with appropriate authorization, for storage and sharing of information.

As used herein, the term "Media" means at least one of a RAM, A ROM, a disk, a DVDROM, a CDROM, an ASIC, a PROM, or any other type of storage means.

As used herein, the term "Network" means a group of two or more computers linked together. There are many types of networks, including: local-area networks (LANs), where the computers are geographically close together, typically, in the same building, and wide area networks (WANs) where the computers are farther apart and are connected by telephone lines or radio waves. In addition to these types, the following characteristics are also used to categorize different types of networks: topology is the geometric arrangement of a computer system (common topologies include a bus, a star, and a ring); the protocol defines a common set of rules and signals that computers on the network use to communicate (one of the most popular protocols for LANs is called Ethernet). Networks can be broadly classified as using either a peer-to-peer or client/server architecture. Computers on a network are sometimes called nodes. Computers and devices that allocate resources for a network are called servers.

Figure 1:
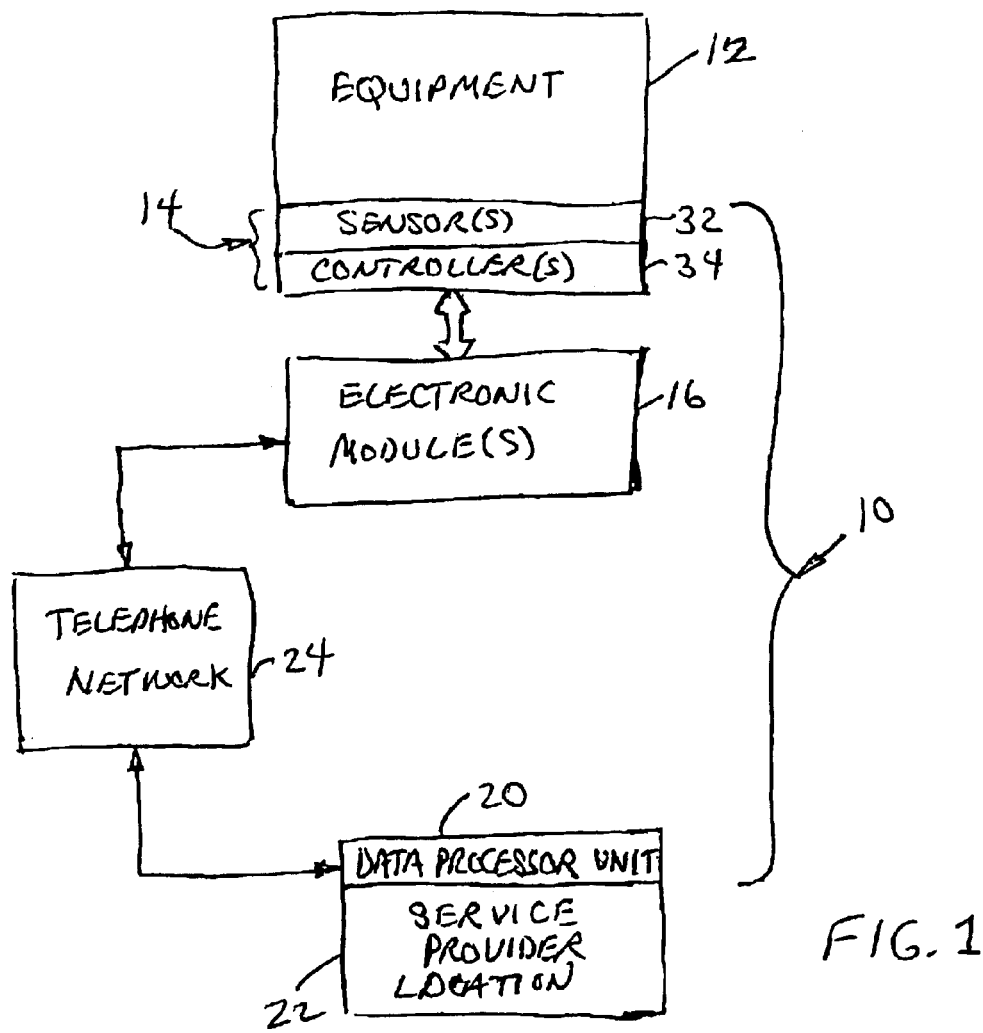
FIG. 1 is a diagrammatic representation of an information gathering system of the present invention for remotely monitoring and diagnosing the condition of equipment, such as household appliances.

Referring now to the drawings and particularly to FIG. 1, there is illustrated an information gathering system of the present invention, generally designated 10, for monitoring and diagnosing the condition of conventional equipment 12. The information gathering system 10 includes means 14 for sensing and electronically storing an indication of the condition of the monitored equipment 12, an electronic module 16 removably connectible with the sensing and storing means 14 and operable to electronically receive and record the equipment condition indication and also removably connectible with a telephone outlet 18 and operable to sense connection with the telephone outlet 18 and being preprogrammed to call a predetermined telephone number in response to the sensing of the connection, and means 20 for responding to the telephone call at a service provider location 22, via a conventional telephone network 24, and in response thereto to download and analyze the equipment condition indication so as to provide an output of a recommended course of action to be taken in order to maintain the monitored equipment 12 in operative condition. In one application of the system 10 of the present invention, the monitored equipment 12 is common household appliances, such as a dishwasher 26, a clothes washer 28 and a clothes dryer 30 as seen in FIG. 2.

Figure 2:
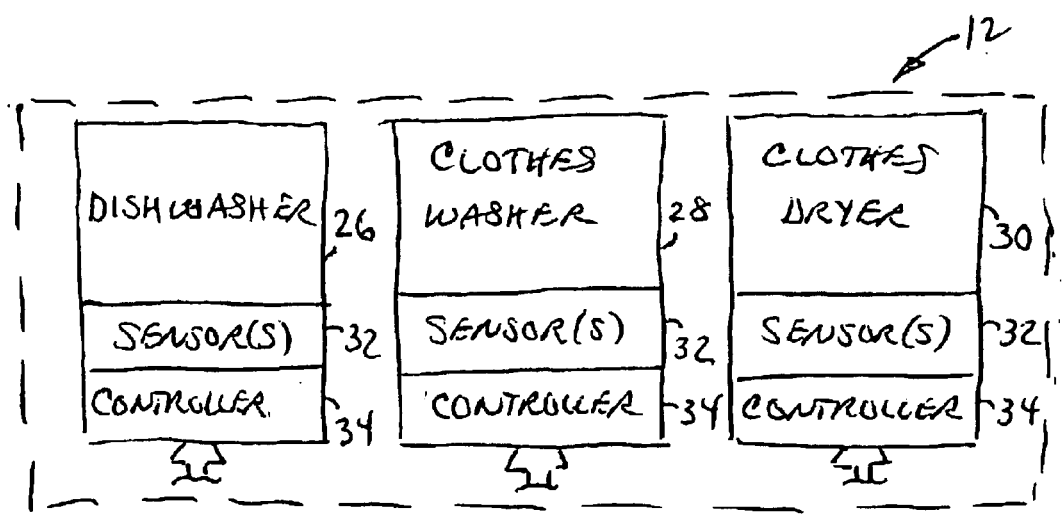
FIG. 2 is a diagrammatic representation of a plurality of conventional household appliances and sensors, microprocessors and detachable electronic modules of the information gathering system of FIG. 1 connected to the appliances.

Referring to FIG. 2, the sensing and storing means 14 of the system 10 includes one or more sensors 32 and one or more electronic controllers 34. One controller 34 is used with each unit of the equipment 12 whereas the number of sensors 32 used depends upon the number of units of the equipment 12 as well as the number of operating parameters of each unit that are to be sensed. Each sensor 32 of sensing and storing means 14 can be a suitable off-the-shelf conventional transducer particularly adapted to sense or detect a signal or movement representative to the particular parameter of the equipment 12 being sensed. The sensor 32 is connected with the unit of monitored equipment 12 at a location thereon where the sensor 32 will be operable to produce an electrical output signal in response to operation of a component, such as an electric motor or a rotating shaft, of the monitored equipment 12 that provides an indication of the current condition of the monitored equipment 12. Each electronic controller 34 of sensing and storing means 14 can be a suitable off-the-shelf conventional microcontroller or microprocessor connected to one or more of the sensors 32 for a given unit of equipment 12 and programmed to monitor the unit via the sensor(s) 32 and to receive the electrical output signals therefrom representing the parameters being monitored. The electrical signals are temporarily stored by the electronic controller 34 and produce electrical outputs that are indications of the current condition of the monitored equipment 12.

Figure 3:
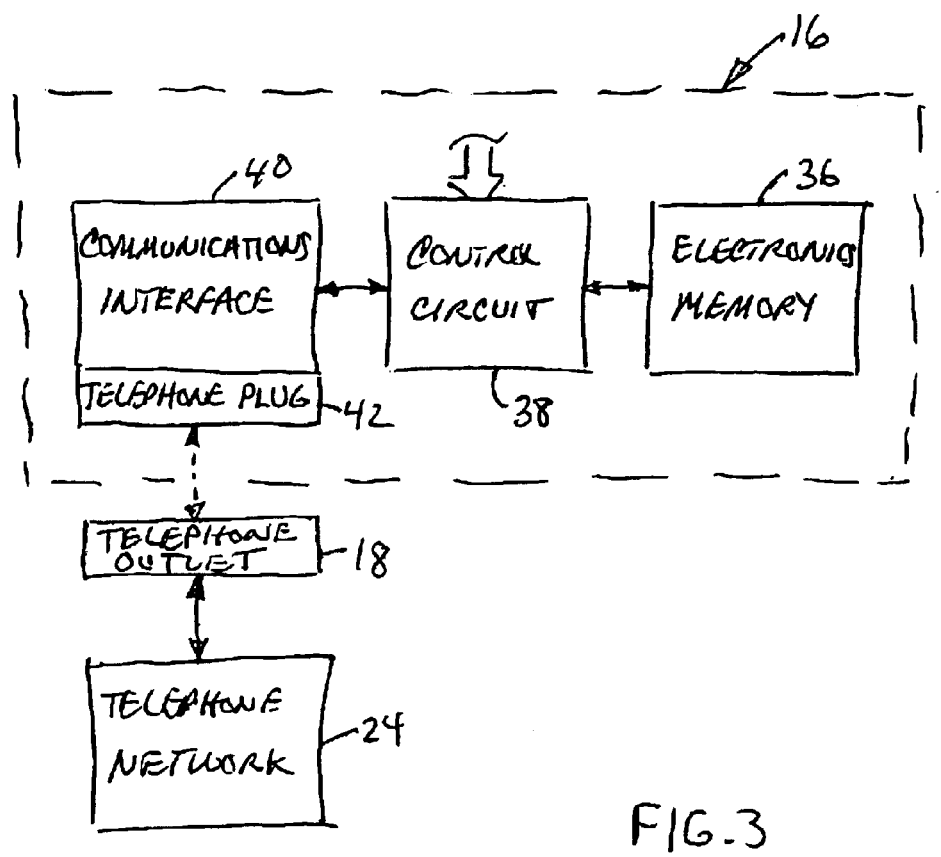
FIG. 3 is a block diagram of the components comprising a detachable electronic module employed in the information gathering system of FIG. 1.

Referring to FIG. 3, each electronic module 16 of the system 10 is removably connectible with, such as by being pluggable into and unpluggable from, one of the electronic controllers 34 and is operable to electronically record the equipment condition indication received from the respective electronic controller 34. Each electronic module 16 includes an electronic memory 36, a control circuit 38 and a communications interface 40 having a telephone plug 42. The electronic memory 36 is preprogrammed to store the predetermined telephone number. The communications interface 40 is connectible via its telephone plug 42 with the telephone outlet 18 and operable to sense a dial tone in response to connection of its telephone plug 42 with the telephone outlet 18. The control circuit 38 is interconnected between the electronic memory 36 and the communications interface 40, connectible with the electronic controller 34 with the plugging of the electronic module 16 into the controller 34 and is operable to store the equipment condition indication signal received from the controller 34. The control circuit 38 also is operable to cause generation of the predetermined telephone number by the electronic memory 36 and to transmit the generated telephone number and the stored equipment condition indication to the telephone outlet 18 via the communications interface 40 and the telephone plug 42 thereof.

Each electronic module 16 will normally be found plugged into a prominent location on its host household appliance so that it will be receiving and recording the current condition and service history as dictated by the appliance's controller 34. When the appliance owner wants assistance with the particular appliance, he or she removes the electronic module 16, physically carries it to a convenient telephone outlet 18 and plugs it into the telephone outlet 18 using the standard telephone plug 42 on the module 16. The communications interface 40 in the module 16 senses the phone connection and dials the preprogrammed telephone number. The data processor unit 20 at the service provider location 22 responds and downloads the data signals from the electronic member 36 of the module 16, analyzes the data and takes a business action. For example, it could light an indicator on the module 16 that tells the consumer that the appliance requires service or automatically dial back to put the consumer in touch with a service representative. The fundamental advantage of the system 10 are low cost remote monitoring of household appliances; avoidance of full time wires or other connections to a communication network; simple operation by the customer; and ensuring that the dedicated service provider receives the first opportunity to repair the appliance.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

What is claimed is:

1. An information gathering system for remotely monitoring and diagnosing the condition of equipment, said system comprising:

sensing and storing means for sensing and electronically storing an indication of the condition of monitored equipment, said indication comprising at least one of a current condition and a service history;

an electronic module removably connectible with said sensing and storing means and operable to electronically receive and record said indication, said electronic module also removably connectible with a telephone outlet and capable of sensing connection with the telephone outlet, said module configured to transmit said indication while not coupled with said sensing and storing means and being preprogrammed to call a predetermined telephone number in response to sensing said connection; and means for responding to said call at a service provider location and in response thereto for downloading and analyzing the equipment condition indication so as to provide an output of a recommended course of action to be taken in order to maintain the equipment in operative condition.

2. The system of claim 1 in which said electronic module includes an electronic memory preprogrammed to store said predetermined telephone number.

3. The system of claim 2 in which said electronic module further includes a communications interface having a telephone plug connectible with the telephone outlet and operable to sense a dial tone in response to connection of said telephone plug with the telephone outlet.

4. The system of claim 3 in which said electronic module further includes a control circuit interconnected between said electronic memory and said communications interface and connectible with said equipment condition indication sensing and storing means, said control circuit being operable to receive and store said equipment condition indication and to cause generation of said predetermined telephone number by said electronic memory and to transmit said generated predetermined telephone number and said stored equipment condition indication to the telephone outlet via said communications interface and said telephone plug thereof.

5. The system of claim 1 in which said sensing and storing means for sensing and electronically storing said equipment condition indication includes at least one sensor connectible with the monitored equipment and operable to produce an electrical signal in response to operation of the monitored equipment that provides said indication of the condition of the monitored equipment.

6. The system of claim 5 in which said sensing and storing means for sensing and electronically storing said equipment condition indication further includes an electronic controller connected to said sensor and operable to receive said electrical signal produced by said sensor, store said electrical signal and produce an output electronically representative of said electrical signal.

7. The system of claim 6 in which said electronic module includes an electronic memory preprogrammed to store said predetermined telephone number.

8. The system of claim 7 in which said electronic module further includes a communications interface having a telephone plug connectible with the telephone outlet and operable to sense a dial tone in response to connection of said telephone plug with the telephone outlet.

9. The system of claim 8 in which said electronic module further includes a control circuit interconnected between said electronic memory and said communications interface and connectible with said electronic controller, said control circuit being operable to receive and store said equipment condition indication and to cause generation of said predetermined telephone number by said electronic memory and to transmit said generated predetermined telephone number and said stored equipment condition indication to the telephone outlet via said communications interface and said telephone plug thereof.

10. An information gathering system for remotely monitoring and diagnosing the condition of equipment, said system comprising:

sensing and storing means for sensing and electronically storing an indication of the condition of monitored equipment, said indication comprising at least one of a current condition and a service history;

an electronic module removably connectible with said sensing and storing means for electronically receiving and recording said indication of equipment condition, said electronic module also removably connectible with a telephone outlet and being capable of sensing connection with the telephone outlet and of dialing a preprogrammed telephone number of a remote service provider location in response to sensing said connection, said module configured to transmit said indication while not coupled with said sensing and storing means; and a data processor unit at the remote service provider location being operable to receive the preprogrammed telephone dialed by said electronic module and to download and analyze the indication of equipment condition recorded by said electronic module so as to provide an output of a recommended course of action to be taken in order to maintain the equipment in operative condition.

11. The system of claim 10, in which said sensing and storing means for sensing and electronically storing said equipment condition indication includes at least one sensor connectible with the monitored equipment and operable to produce an electrical signal in response to operation of the monitored equipment that provides said indication of the condition of the monitored equipment.

12. The system of claim 11 in which said sensing and storing means for sensing and electronically storing said equipment condition indication further includes an electronic controller connected to said sensor and operable to receive said electrical signal produced by said sensor, store said electrical signal and produce an output electronically representative of said electrical signal.

13. The system of claim 10 in which said electronic module includes an electronic memory preprogrammed to store said predetermined telephone number.

14. The system of claim 13 in which said electronic module further includes a communications interface having a telephone plug connectible with the telephone outlet and operable to sense a dial tone in response to connection of said telephone plug with the telephone outlet.

15. The system of claim 14 in which said electronic module further includes a control circuit interconnected between said electronic memory and said communications interface and connectible with said equipment condition indication sensing and storing means, said control circuit being operable to receive and store said equipment condition indication and to cause generation of said predetermined telephone number by said electronic memory and to transmit said generated predetermined telephone number and said stored equipment condition indication to the telephone outlet via said communications interface and said telephone plug thereof.

16. The system of claim in 15 which said sensing and storing means for sensing and electronically storing said equipment condition indication includes at least one sensor connectible with the monitored equipment and operable to produce an electrical signal in response to operation of the monitored equipment that provides said indication of the condition of the monitored equipment.

17. The system of claim 16 in which said sensing and storing means for sensing and electronically storing said equipment condition indication further includes an electronic controller connected to said sensor and operable to receive said electrical signal produced by said sensor, store said electrical signal and produce an output electronically representative of said electrical signal.

* * * * *